United States Patent
Tanaka

(10) Patent No.: US 7,589,695 B2
(45) Date of Patent: Sep. 15, 2009

(54) IMAGE DISPLAY APPARATUS, MULTIDISPLAY APPARATUS, AND BRIGHTNESS MANAGEMENT APPARATUS

(75) Inventor: Teruto Tanaka, Takatsuki (JP)

(73) Assignee: Panasonic Corporation, Osaka (JP)

( * ) Notice: Subject to any disclaimer, the term of this patent is extended or adjusted under 35 U.S.C. 154(b) by 178 days.

(21) Appl. No.: 10/514,088

(22) PCT Filed: May 21, 2003

(86) PCT No.: PCT/JP03/06316

§ 371 (c)(1),
(2), (4) Date: Apr. 25, 2005

(87) PCT Pub. No.: WO03/098344

PCT Pub. Date: Nov. 27, 2003

(65) Prior Publication Data

US 2005/0219271 A1 Oct. 6, 2005

(30) Foreign Application Priority Data

May 21, 2002 (JP) ............................ 2002-145821

(51) Int. Cl.
*G09G 5/00* (2006.01)
(52) U.S. Cl. ........................................ 345/1.3; 345/1.1
(58) Field of Classification Search ........... 345/1.1–1.3, 345/2.1–2.3, 4–9, 31–33, 40, 77, 205, 211, 345/214, 690
See application file for complete search history.

(56) References Cited

U.S. PATENT DOCUMENTS

| | | | | |
|---|---|---|---|---|
| 4,061,911 A | * | 12/1977 | Krasin | 362/20 |
| 4,964,719 A | * | 10/1990 | Tachikawa et al. | 353/85 |
| 5,396,257 A | * | 3/1995 | Someya et al. | 345/1.1 |
| 5,581,075 A | * | 12/1996 | Naraki et al. | 250/205 |
| 6,268,799 B1 | * | 7/2001 | Miyashita et al. | 340/641 |
| 6,690,282 B2 | * | 2/2004 | Miyashita et al. | 340/641 |
| 6,804,406 B1 | * | 10/2004 | Chen | 382/254 |
| 6,979,085 B2 | * | 12/2005 | Lurkens et al. | 353/29 |
| 7,006,004 B2 | * | 2/2006 | Miyashita et al. | 340/815.73 |
| 2001/0005172 A1 | * | 6/2001 | Miyashita et al. | 340/641 |
| 2001/0013843 A1 | * | 8/2001 | Fujiwara et al. | 345/1.2 |

FOREIGN PATENT DOCUMENTS

| | | |
|---|---|---|
| JP | 10090645 A | 4/1998 |
| JP | 2001056517 A | 2/2001 |
| JP | 2001-142145 | 5/2001 |
| JP | 2001249652 A | 9/2001 |

OTHER PUBLICATIONS

Machine translation of JP-2001-249652.*
Machine translation of JP-2001-056517.*
Machine Translation of JP-2001-142145A.*
Translation of JP-2001249652 by Schreiver Translation, Inc.*

* cited by examiner

*Primary Examiner*—Alexander Eisen
*Assistant Examiner*—Jason M Mandeville

(57) ABSTRACT

A multi-display device for connecting projection screens of a plurality of image display devices so as to form one-screen image. Each of the image display devices includes a luminance lowering characteristic storage unit for storing a look-up table indicating average luminance lowering characteristic of a projection lamp, a timer unit for counting the lit time of lamp of the device, a lit time storage unit for accumulating and storing the lit time from the lamp use start moment, and an external communication unit for communicating.

8 Claims, 13 Drawing Sheets

FIG.6

| LIGHTING HOURS | 0 | 50 | 100 | 150 | 200 | 250 | 300 | 350 | 800 | 850 | 900 | 950 | 1000 | 1050 | 1100 | ... |
|---|---|---|---|---|---|---|---|---|---|---|---|---|---|---|---|---|
| BRIGHTNESS | 100% | 88% | 82% | 78% | 76% | 74% | 72% | 71% | 62% | 61% | 60% | 59% | 58% | 57% | 56% | ... |

IMAGE DISPLAY APPARATUS, MULTIDISPLAY APPARATUS, AND BRIGHTNESS MANAGEMENT APPARATUS

FIELD OF THE INVENTION

The present invention relates to a projection image display apparatus, a multidisplay apparatus equipped with a plurality of such image display apparatuses, and a brightness management apparatus that manages the image display apparatuses so as to produce equal brightness throughout their projection pictures.

BACKGROUND ART

In recent years, large-size screens have been often used for image display, in various places such as disaster-prevention headquarters, monitor rooms of power stations, and sites of concerts and of events. In typical cases, a so-called multidisplay apparatus that allows a plurality of image display apparatuses to display a plurality of images side by side on a large screen is used (hereinafter, each projection image display apparatus is referred to as "a projector").

In such a multidisplay apparatus, continuity of the projection pictures is important so that viewers do not feel a sense of inconsistency between the displayed images. Conventional projectors have a function for adjusting the brightness of their projection pictures, and so can equalize the brightness between the pictures, thereby maintaining continuity of the adjacent pictures.

Conventional lamps used for such projectors are high intensity lamps such as high-pressure mercury lamps and xenon lamps. Such high intensity lamps have a certain operating life, and their brightness is characterized by decreasing rapidly within a certain period in the lighting start, and then moving on to gradual decrease afterwards.

Accordingly, the conventional lamps have the following problem. Suppose that the lamp for one of the projectors is replaced, and the brightness of the projector is adjusted to be the same as those of the other projectors. Even so, as the time elapses, the brightness of the projector will get out of sync with the brightness of the other projectors.

Conventionally, adjusters have to perform regular brightness adjustment (e.g. in every 200 hours of lighting for a lamp), so as to correct the difference in brightness generated between the plurality of projectors incident to elapse of time. However it is a troublesome work. Besides, the adjusters are usually specialists in that field, which incurs a great amount of maintenance cost.

The present invention is conceived in light of the aforementioned problem, and has an object of providing: an image display apparatus for realizing image display with integrity on the whole, which hardly necessitates adjustment by specialists; a multidisplay apparatus equipped with a plurality of such image display apparatuses; and a brightness management apparatus that manages the brightness of each image display apparatus in the multidisplay apparatus.

DISCLOSURE OF INVENTION

So as to achieve the above object, an image display apparatus according to the present invention is an image display apparatus of projection-type used in a multidisplay apparatus in which a plurality of image display apparatuses are arranged so as to realize respective projection pictures adjacent to each other, the image display apparatus having: an image forming device operable to form an image according to an image signal; a projection unit including a projection lamp, and operable to form a projection picture by projecting the formed image onto a projection screen; a first obtaining unit operable to obtain lighting hours of the projection lamp of the projection unit, as information indicating brightness of the projection lamp of the projection unit; a communication unit operable to communicate with another image display apparatus in the multidisplay apparatus; a second obtaining unit operable to obtain lighting hours of a projection lamp of the other image display apparatus, as information indicating brightness of the projection lamp of the other image display apparatus, via the communication unit; and a brightness correction unit operable to correct brightness of the projection picture formed by the projection unit so as to be in agreement with projection-lamp brightness of an image display apparatus whose lighting hours are the longest of the image display apparatuses in the multidisplay apparatus, according to the information obtained by the first and second obtaining units.

The stated structure enables the image display apparatus to communicate with the other image display apparatuses for obtaining information indicating brightness of the respective projection lamps, and to perform automatic correction of brightness of the projection picture of the image display apparatus itself, based on said information and information indicating brightness of the projection lamp of the image display apparatus. Therefore, if such an image display apparatus is included in a multidisplay apparatus, regular brightness adjustment by a mechanic becomes unnecessary.

In addition, a multidisplay apparatus according to the present invention is a multidisplay apparatus having: a plurality of projection image display apparatuses arranged so as to realize respective projection pictures adjacent to each other; and an image distribution unit operable to generate image signals respectively used for display realized at the image display apparatuses, from an inputted image signal, and to distribute the generated image signals to the image display apparatuses respectively, where each of the image display apparatuses includes: an image forming device operable to form an image according to an image signal; a projection unit including a projection lamp, and operable to form a projection picture by projecting the formed image onto a projection screen; a first obtaining unit operable to obtain lighting hours of the projection lamp of the projection unit, as information indicating brightness of the projection lamp of the projection unit; a communication unit operable to communicate with another image display apparatus in the multidisplay apparatus; a second obtaining unit operable to obtain lighting hours of a projection lamp of the other image display apparatus, as information indicating brightness of the projection lamp of the other image display apparatus, via the communication unit; and a brightness correction unit operable to correct brightness of the projection picture formed by the projection unit so as to be in agreement with projection-lamp brightness of an image display apparatus whose lighting hours are the longest of the image display apparatuses in the multidisplay apparatus, according to the information obtained by the first and second obtaining units.

In addition, a multidisplay apparatus according to the present invention is a multidisplay apparatus having: a plurality of projection image display apparatuses arranged so as to realize respective projection pictures adjacent to each other; and an image distribution unit operable to generate image signals respectively used for display realized at the image display apparatuses, from an inputted image signal, and to distribute the generated image signals to the image display apparatuses respectively, where the image distribution unit includes: an obtaining unit operable to obtain lighting hours of a projection lamp of each image display apparatus as information indicating brightness of a projecting lamp of each image display apparatus; and brightness correction units respectively provided for the image display apparatuses respectively, each brightness correction unit being operable to control an image signal to be transmitted to a corresponding image display apparatus, so as to correct brightness of a corresponding projection picture; and a control unit operable to detect an image display apparatus whose lighting hours are the longest of the image display apparatuses in the multidisplay apparatus, and control the other image display apparatuses' brightness correction units to adjust brightness of respective projection pictures to brightness of a projection picture of the image display apparatus whose lighting hours are the longest.

According to the stated structures, it becomes possible to obtain a multidisplay apparatus equipped with functions for automatically correcting the brightness of each projection, picture.

Furthermore, the present invention is a brightness management apparatus for, in a multidisplay apparatus in which a plurality of image display apparatuses are arranged to realize respective projection pictures adjacent to each other, managing brightness of the projection pictures, the brightness management apparatus having: a communication unit operable to communicate with the image display apparatuses; an obtaining unit operable to obtain lighting hours of a projection lamp of each image display apparatus as information indicating brightness of a projection lamp of each image display apparatus, via the communication unit; and a control unit operable to control, via the communication unit and according to the information obtained by the obtaining unit, one or more of the image display apparatuses so as to adjust brightness of all the projection pictures to brightness of a projection picture of an image display apparatus whose projection lamp has lowest brightness of all the image display apparatuses.

According to such a brightness management apparatus, it becomes possible to easily execute brightness adjustment in a multidisplay apparatus.

BRIEF DESCRIPTION OF THE DRAWINGS

FIG. 6 is a diagram showing one example of the look up table showing an average brightness decreasing characteristic.

BEST MODE FOR CARRYING OUT THE INVENTION

The following describes embodiments of the multidisplay apparatus according to the present invention, using the drawings.

FIRST EMBODIMENT (1) Entire Structure of Multidisplay Apparatus

Figure 1:
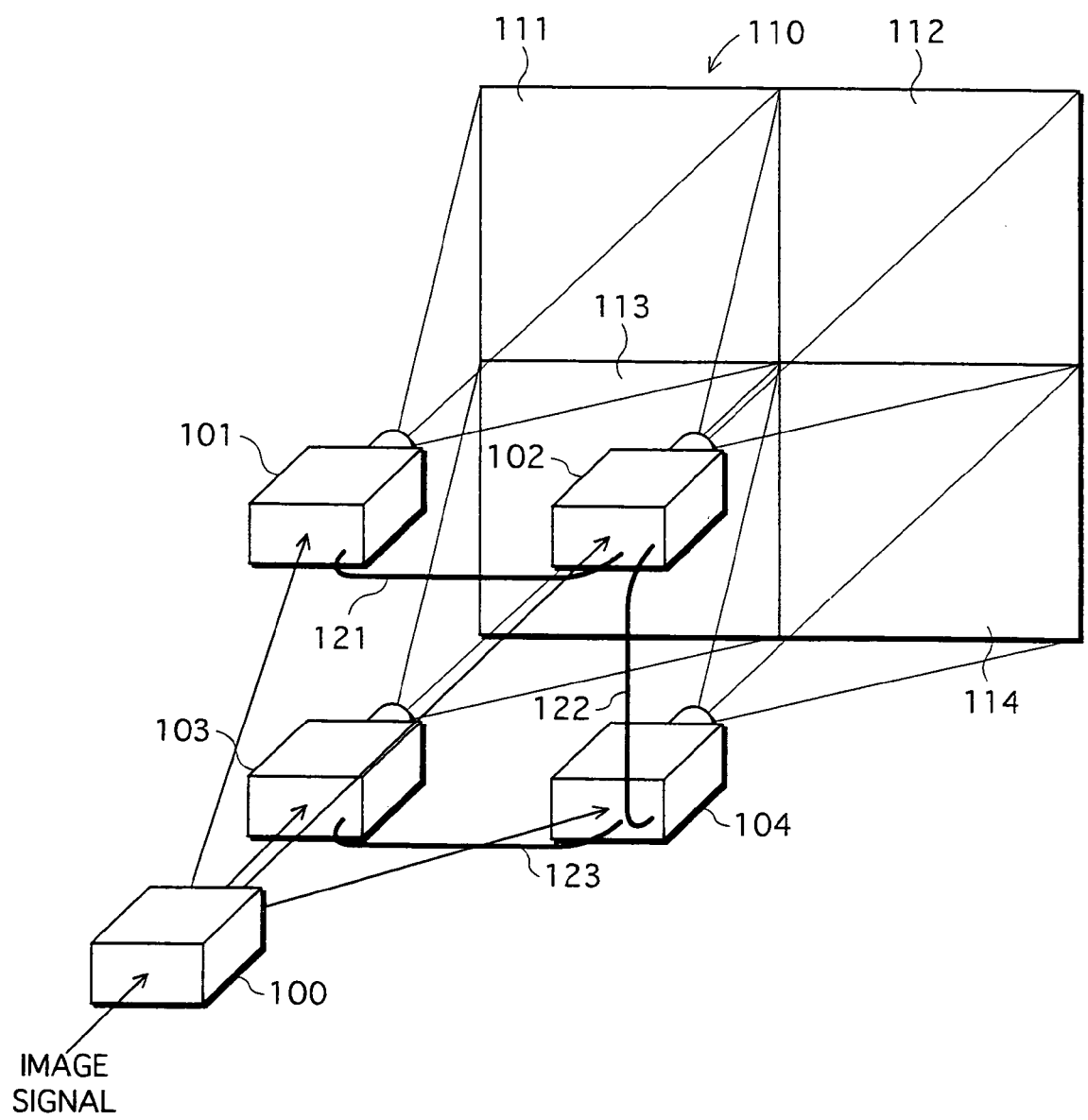
FIG. 1 is a diagram showing the entire structure of a multidisplay apparatus relating to the first embodiment of the present invention.

FIG. 1 shows the entire structure of a multidisplay apparatus. In the first embodiment, the multidisplay apparatus is comprised of an image distribution apparatus 100 and four projectors 101-104.

The image distribution apparatus 100 divides an image signal of one screen, which is received from a videocassette recorder or a personal computer, into four that respectively correspond to four projectors 101-104, performs predetermined signal processing such as image enlargement, to each of the four signals, and outputs the four signals after being processed to the projectors 101-104, respectively.

The projectors 101-104 are structured to form an image on their image display device according to the inputted image signal, and irradiate thereto the light from their projection lamp, thereby projecting resulting transmitted light on a screen 110 via a projection lens. Projection pictures 111-114 are provided to be adjacent to each other to correspond to the length and height of the square-shaped screen 110, and to project images at the same magnification.

The projectors 101-104 are connected to each other via communication cables 121, 122, and 123, and are communicable through a serial interface such as RS-232C, so as to be able to exchange information required to adjust brightness mutually. Greater details are given later.

(2) Structure of Image Distribution Apparatus 100

Figure 2:
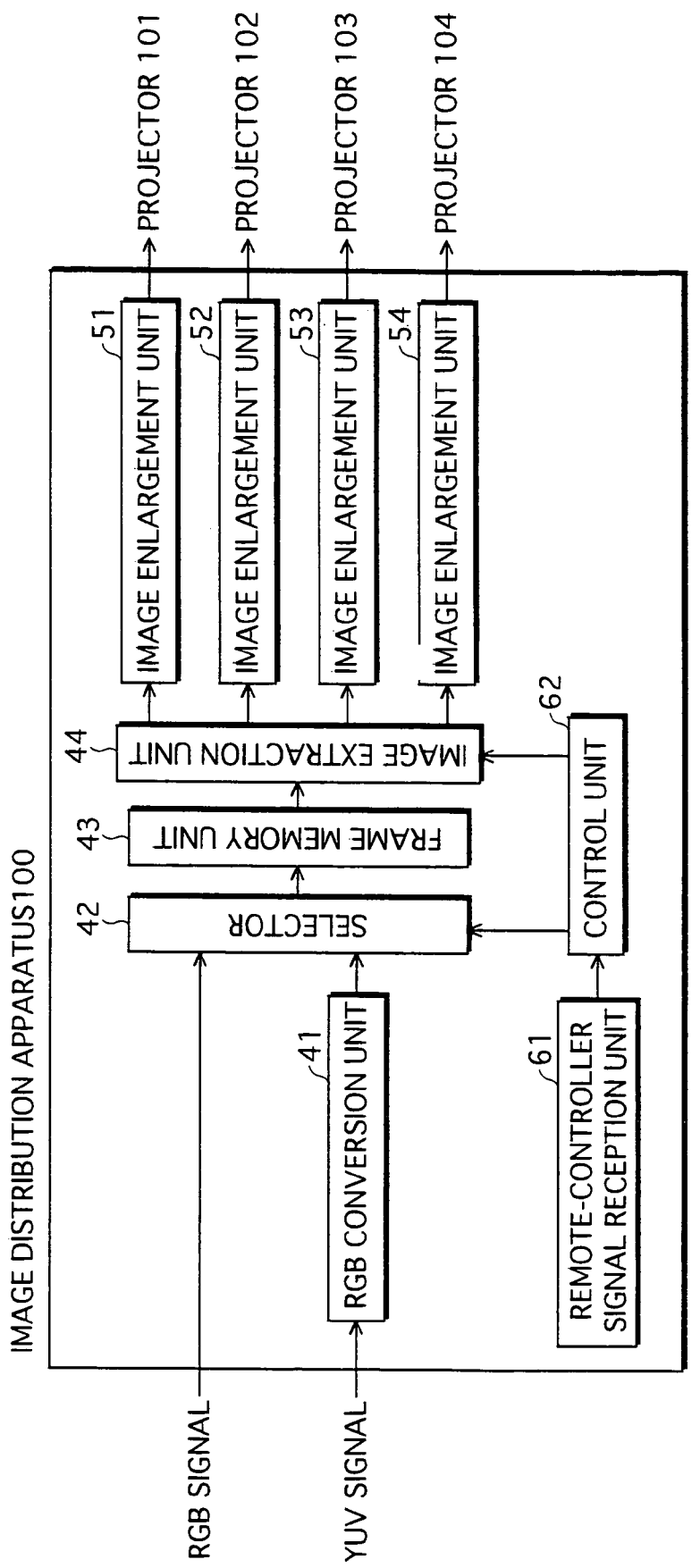
FIG. 2 is a block diagram showing the structure of an image distribution apparatus.

FIG. 2 is a block diagram showing the structure of the image distribution apparatus 100.

As shown in this drawing, the image distribution apparatus 100 is made up of an RGB (Red, Green, Blue) conversion unit 41, a selector 42, a frame memory unit 43, an image extraction unit 44, an image enlargement units 51-54, and so on.

When a signal inputted from an external apparatus is a bright/color-difference signal (YUV signal), the signal is first converted into an RGB signal at the RGB conversion unit 41, and then transmitted to the selector 42. The RGB conversion unit 41 is made up of a publicly-known matrix operation circuit, and converts a YUV signal into an RGB signal.

The selector 42 is switched between "RGB signal input" and "YUV signal input" according to remote control of an operator and the like, and transmits the inputted signal to the frame memory unit 43.

The frame memory unit 43 is equipped with frame memories for red(R), green(G), blue(B), respectively, where each memory can store the value of a respective image signal for one screen.

The image extraction unit 44, for each color, divides an image signal for one screen, into four sections as arranged in the output screen, by referring to the memory address. Then the four resulting portions of the image signal are outputted to the image enlargement units 51-54, respectively.

The image enlargement units 51-54 enlarge the respective images extracted by the image extraction unit 44 by interpolating signals between each pixel for each of R, G, B, and increasing the number of pixels so that the images are respectively displayed on a corresponding one of the pictures of the projectors 101-104. More specifically, the image enlargement units 51 to 54 use a resize LSI.

The image signals having undergone enlargement processing in the image enlargement units 51-54 are sent to the corresponding projectors 101-104.

The remote-controller signal reception unit 61 receives an instruction from a remote controller 80 (see FIG. 8) by means of infrared radiation, for example. The remote-controller signal reception unit 61 then conveys the instruction to a control unit 62. The control unit 62, according to the instruction, performs control such as switching the selector 42 and setting extraction conditions of images for the image extraction unit 44.

(3) Structure of Projectors

The projectors 101-104 have the same structure each other, and so only the structure of the projector 101 is described in the following, as a representative.

Figure 3:
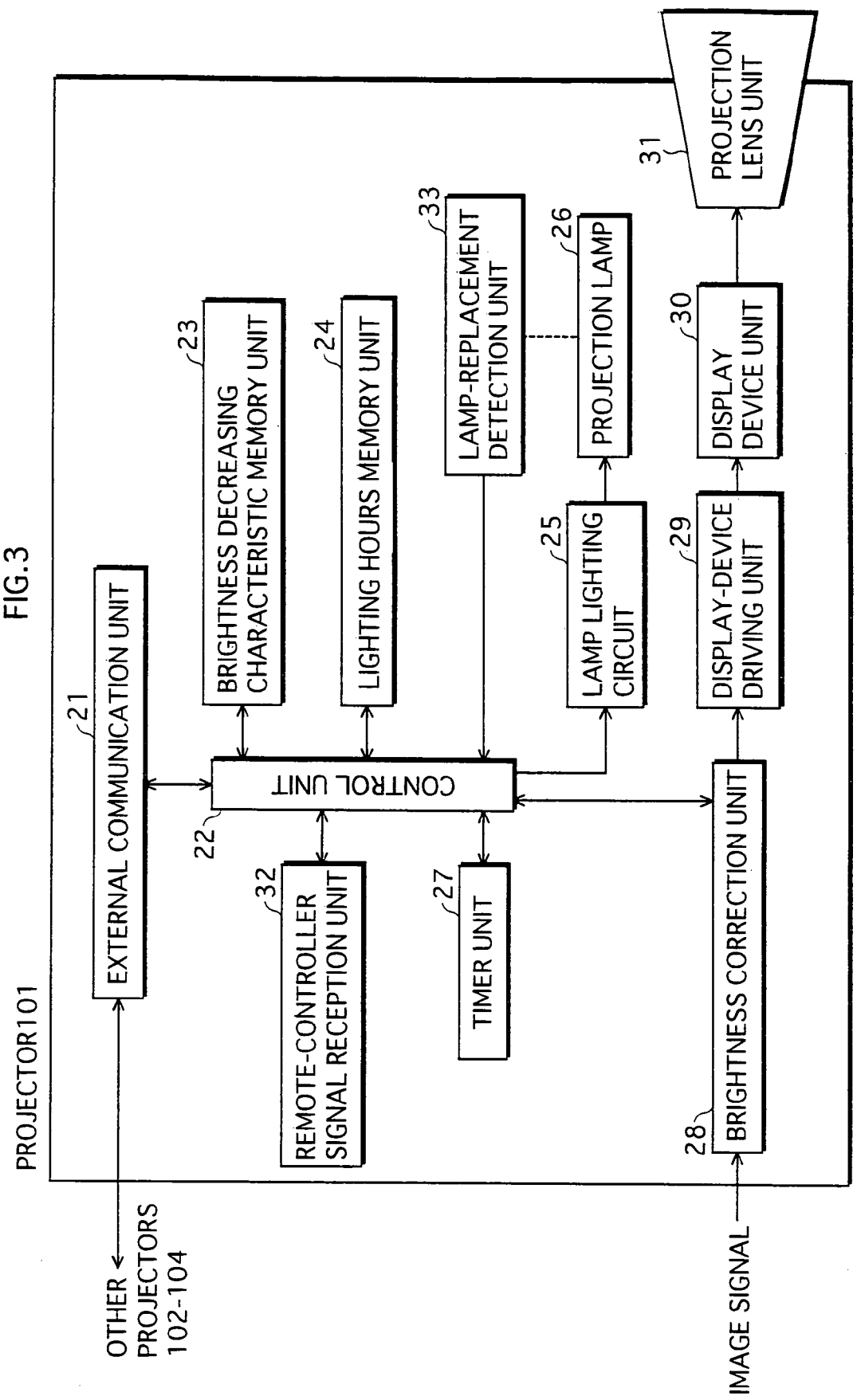
FIG. 3 is a block diagram showing the structure of a projector.

FIG. 3 is a block diagram showing the structure of the projector 101.

As shown in this drawing, the projector 101 is made up of an external communication unit 21, a control unit 22, a brightness decreasing characteristic memory unit 23, a lighting hours memory unit 24, a lamp lighting circuit 25, a projection lamp 26, a timer unit 27, a brightness correction unit 28, a display-device driving unit 29, a display device unit 30, a projection lens unit 31, a remote-controller signal reception unit 32, a lamp-replacement detection unit 33, and the like.

The external communication unit 21 communicates with external communication units of the projectors 102-104, so as to acquire information that indicates brightness for corresponding lamps (brightness information), and to provide their own brightness information to the other projectors. In the present embodiment, the brightness information is lighting hours accumulated since the lamp operating start for each projector (occasionally simply referred to as "lighting hours").

The control unit 22 is made up of a CPU, a ROM for storing a control program and so on, a RAM that includes a table for temporarily storing lighting hours data of the other projectors acquired by communication, an EEPROM, and the like. The control unit 22 controls each unit included in the projector 101 so as to facilitate smooth image display.

In particular, the control unit 22 refers to its own brightness information and the brightness information of the other projectors obtained through the external communication unit 21, and when necessary, instructs the brightness correction unit 28 to correct the brightness of its own projection picture, so that the projection picture will produce the same brightness as those of the other projectors 102-104. Greater details will be given later.

The brightness decreasing characteristic memory unit 23 has a look up table (LUT) in which an average brightness decreasing characteristic is recorded, where the average brightness decreasing characteristic has resulted by conducting tests on the relation between lighting hours and brightness decrease with use of a plurality of same kind of lamps, and then taking an average.

Figure 4:
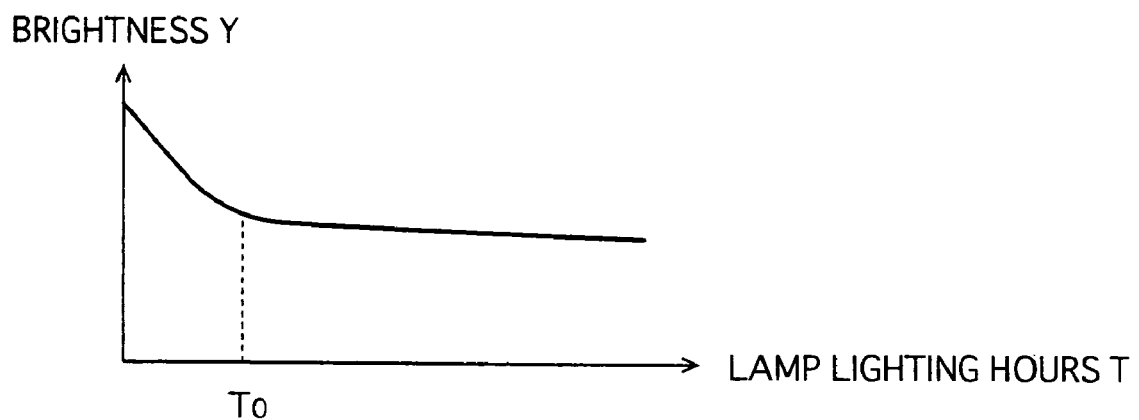
FIG. 4 is a graph exhibiting the relation between lamp lighting hours and brightness (i.e. brightness decreasing characteristic).

FIG. 4 is a graph illustrating an example of the average brightness decreasing characteristic of the projection lamp 26. As shown in this graph, generally in the high-pressure discharge lamp such as xenon lamps, the brightness decreases rapidly from the lighting start to a certain time T0, and then moves onto a gradual decrease where the decrease rate is almost constant.

FIG. 6 shows an example of LUT showing the described brightness decreasing characteristic. When necessary, the control unit 22 reads the lighting hours information of the lamp, from the lighting hours memory unit 24, and estimates the current brightness of the projection lamp 26, by referring to the aforesaid LUT. It should be noted that the lighting hours between those listed in this diagram are obtainable by interpolating as appropriate, by using publicly-known linear interpolation or the like.

The lighting hours memory unit 24 is to store an accumulated value of the lighting hours of the projection lamp 26.

The lamp lighting circuit 25, upon reception of a lighting instruction from the control unit 22, generates a high-voltage pulse, thereby causing the projection lamp 26 to start discharge. Thereafter, the lamp lighting circuit 25 performs constant-power control so as to have the projection lamp 26 to emit a constant light flux, and stops the power supply to the projection lamp 26, upon receiving an extinguishing instruction from the control unit 22.

The timer unit 27 resets the stored time to start counting, every time the control unit 22 issues a lighting instruction to the lamp lighting circuit 25. The control unit 22, when issuing an extinguishing instruction, adds the counted time so far to the time stored in the lighting hours memory unit 24, to update the lighting hours with the resulting hours by the adding.

The brightness correction unit 28, according to the instruction issued by the control unit 22, controls the signal value (voltage) of the image signal so that the resulting brightness will have a desired value, then outputs the image signal to the display-device driving unit 29.

Figure 7:
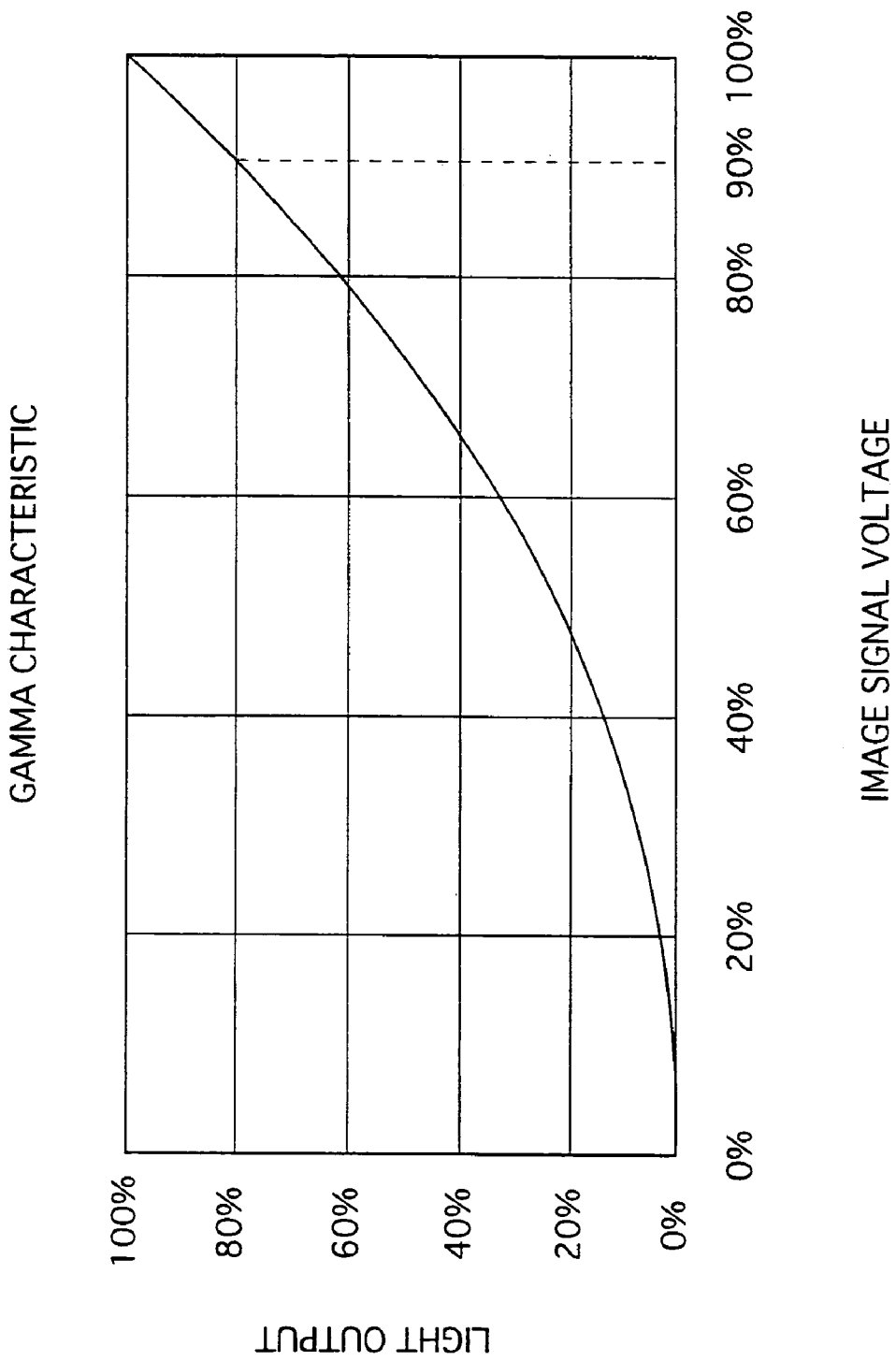
FIG. 7 is a diagram showing one example of the gamma characteristic, stored in a brightness correction unit.

Concretely, the brightness correction unit 28 includes therein a nonvolatile memory (not shown) for storing a LUT showing gamma characteristic of the display device unit 30. This gamma characteristic represents a relation between the signal value (voltage value) of an inputted image signal and the brightness of a transmitted light in the display device unit 30. FIG. 7 shows one example of the gamma characteristic, where the lengthwise axis signifies the voltage value of the image signal, and the longitudinal axis signifies the light output (brightness) of the projection lamp 26, respectively in unit of percentage.

The brightness correction unit 28 receives a brightness change instruction together with a corresponding target brightness value information, obtains the amount of voltage to be changed by referring to the gamma characteristic LUT described above. According to this, the brightness correction unit 28 changes the voltage value of the image signal, thereby changing the brightness of the projection picture. In the example of FIG. 7, it can be understood that if the brightness of the projection picture should be reduced to 80% of the current value, the voltage of the image signal is required to be reduced by about 10%.

The display-device driving unit 29 drives the display device unit 30 according to the image signal after undergoing the brightness correction, so as to have it form an image.

The display device unit 30 is for example a translucent color liquid crystal panel, and the image formed therein is projected onto a screen not shown in the drawing via the projection lens unit 31 by being irradiated by the projection lamp 26.

The projection lens unit 31 contains therein a projection lens and a lens driving mechanism for focusing and zooming. The projection lens unit 31 performs the focusing/zooming in response to instructions from the control unit 22.

The remote signal reception unit 32 receives an instruction from the remote controller 80 through infrared radiation communication, and conveys the content of the instruction to the control unit 22.

The lamp-replacement detection unit 33 detects an incident of replacement of the projection lamp 26, and notifies the control unit 22 of the incident. The control unit 22, in response to reception of the notification, resets the lighting hours stored in the lighting hours memory unit 24.

Note that, as an example, the lamp-replacement detection unit 33 may be implemented as follows. That is, a limit switch is provided, which is set ON (or OFF) when the lamp base is set to the socket portion of the projection lamp 26. Then when the limit switch is changed from ON to OFF (or vice versa), it is designed to detect that the replacement of the projection lamp 26 is performed. Alternatively, a photoelectric sensor, which is used to detect the strength of the light flux of the projection lamp 26, may be provided inside the projector 101 where it does not obstruct the image projection. Then its output value is designed to be regularly sampled and stored in the nonvolatile memory, and if the sampled value shows a great increase from the latest sampled value, it is judged that the replacement of the projection lamp 26 is performed. Still alternatively, it is also possible to simply have the user who has replaced the projection lamp 26 to input the incident, using an operation unit not shown in the drawing, or using the remote controller 80.

Sometimes another signal processing circuit of the projector 101, such as a color-level conversion circuit for adjusting chromaticity of images and a contrast circuit, is placed in front of the display device driving unit 29. However, such circuits are not directly related to the contents of the present invention, and so are not illustrated in the drawing.

Figure 8:
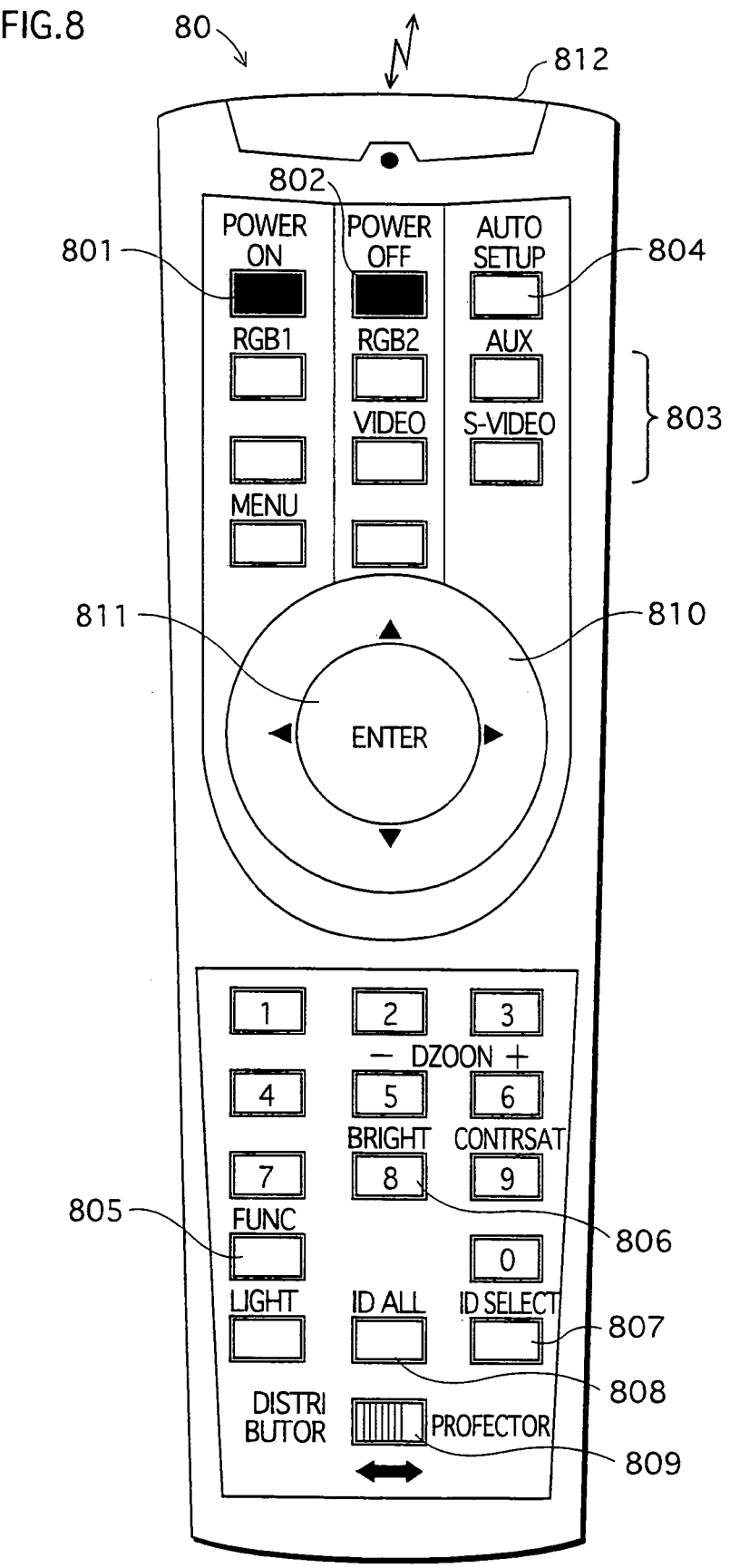
FIG. 8 is a diagram showing one example of operation buttons of a remote controller shared by a plurality of projectors and an image distribution apparatus.

FIG. 8 shows an example of the structure of the operation buttons of the remote controller 80 used for operating the multidisplay apparatus.

As shown in this drawing, the remote controller 80 includes a power ON button 801, a power OFF button 802, a source-selection button group 803 for selecting the source of an image signal, a brightness automatic-correction instruction button 804, a function button 805, a brightness manual-adjustment mode button 806, an ID select button 807, an all-apparatus selection button 808, a switch 809 for switching the transmission destination between a projector and the image distribution apparatus, a four-direction switch 810, an enter button 811, and the like.

Here, the projectors 101-104 are assigned an apparatus ID (e.g. simply 1-4). When operation should be directed to only the projector 101, after the ID select button 807 is pushed, the apparatus ID button "1" should be pushed.

In addition, when all the projectors 101-104 should be operated simultaneously, the all-apparatus selection button 808 should be pushed.

As detailed later, the brightness correction operation is performed automatically at a predetermined time interval. However, when the user, looking at the screen, judged that immediate automatic correction of brightness is necessary, the brightness automatic-correction instruction button 804 should be pushed.

In addition, the brightness manual-adjustment mode button 806 is used when the user intends to manually correct the brightness of each projector independently.

Please note that the present remote controller 80 is structured to communicate with the projectors 101-104 and with the image distribution apparatus 100, using infrared radiation communication, and the reference numeral 812 represents a lighting unit for such infrared radiation.

(4) Contents of Brightness Correction Operation

Now, suppose the projection lamps 26 of the projectors 101-104 are replaced with new ones at the same time. Then when the time T1 has passed after the start of lighting, the projection lamp 26 of the projector 101 has ended its life, and is replaced with a new one.

Figure 5:
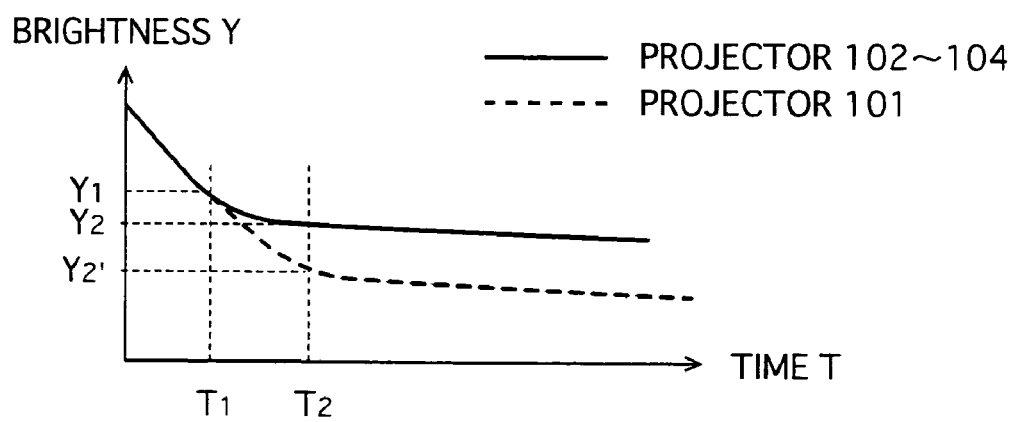
FIG. 5 is a graph exhibiting the change in brightness of the projection lamp in each projector, in a case where no brightness correction is performed after the time T1, when a projection lamp of one projector was replaced and brightness correction is performed.

As shown in the brightness decreasing characteristic diagram of FIG. 5, even if the projectors 101-104 are adjusted to produce the same brightness at the time T1, the projection lamp 26 will have different brightness from those of other projection lamps at the time T2, because it was new at the time T1 and so its brightness has a large decreasing rate (FIG. 5, the dotted line portion) compared to those of the other projectors 102-104 (FIG. 5, the solid line portion).

In this case, it is very troublesome to call a specialist for brightness adjustment each time. Besides, if a specialist is hired, it incurs a great amount of maintenance cost.

Therefore in this embodiment, the following approach is taken to automatically correct the brightness difference.

Figure 9:
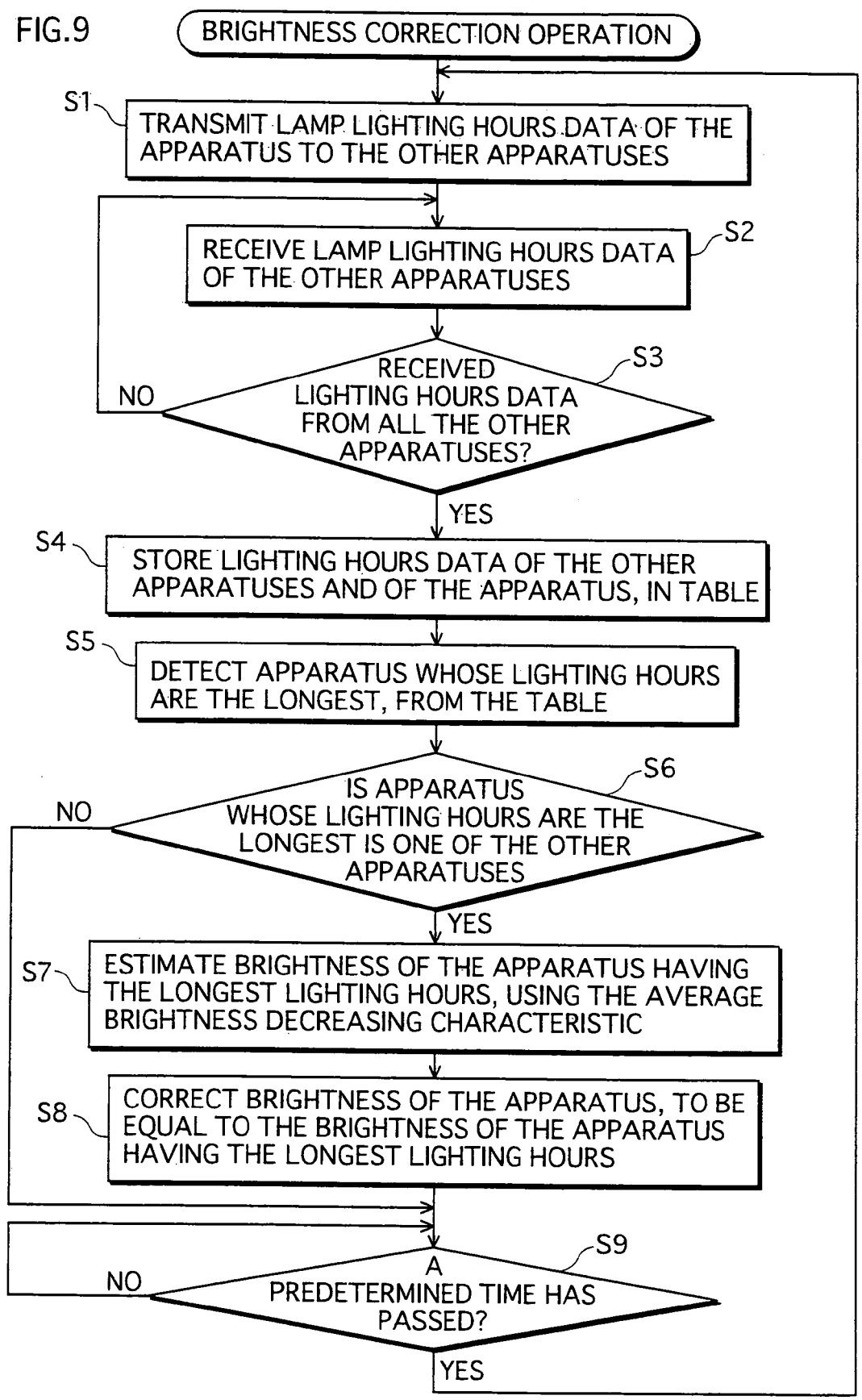
FIG. 9 is a flowchart showing the content of brightness correction operation performed by a control unit of a projector.

FIG. 9 is a flowchart showing the contents of the brightness correction operation that the control unit 22 performs. In this embodiment, this operation is performed automatically after the power is turned on to the projector 101. However, not limited to this, it is also possible to perform the operation in response to the user instruction through the remote controller 80 and the like. Note that "projector" is simply called "apparatus" in the following explanation of the flowchart.

First, lighting hours data of an apparatus is read from its own lighting hours memory unit 24, and is transmitted, as the brightness information of the apparatus, to the other projectors 102-104, using a publicly-known communication protocol and through the external communication unit 21 (Step S1). In transmission, the lighting hours data is assigned apparatus IDs respectively for destination and origin, as header information.

Meanwhile, the other apparatuses also transmit their own lighting hours data to the apparatus. The apparatus will receive the lighting hours data (brightness information) of the other apparatuses together with a corresponding apparatus ID, one after another (Step S2). In reception, it is possible to perform publicly-known congestion control so that the transmissions from the apparatuses will not collide with each other.

Then, at Step S3, it is judged whether reception of the lighting hours data from all the other apparatuses is complete, and if judging negatively, the control will be returned to Step S2, and reception operation is repeated. If judging affirmatively, the control will move to the next Step S4, and the received lighting hours data and the lighting hours data for the apparatus itself are stored in the table contained in the RAM of the control unit 22, in association with the apparatus IDs. Note here that the order of the operations of Step S3 and S4 may be changed, and that every time the lighting hours data is received, the data will be sequentially stored in the table.

By comparing the lighting hours data sets stored in the table, the apparatus having the longest lighting hours is detected (i.e. the apparatus whose brightness is the lowest) (Step S5), and if it is one of the other apparatuses (Step S6:YES), it is necessary to adjust the brightness to that of the other apparatus. Therefore estimation is performed as to the lamp brightness of the other apparatus, from the brightness decreasing characteristic LUT stored in the brightness decreasing characteristic memory unit 23 (Step S7), and instructs the brightness correction unit 28 to correct the brightness of the projection picture of the apparatus itself (Step S8).

Here, please note that the estimation, which is obtained based on the brightness decreasing characteristic stored in the brightness decreasing characteristic memory unit 23, is the lamp's brightness. The brightness correction unit 28 has to decrease the voltage of the image signal so that the brightness of the projection picture will decrease so as to correspond to the lamp's brightness decrease (Step S8).

More specifically, the lamp brightness of the apparatus is obtained from the lighting hours of the apparatus and the brightness decreasing characteristic, and is set as Yp. The aforesaid lowest lamp brightness is set as Yq. In view of the fact that the brightness of a projection picture can be considered to be in proportion to the brightness of a corresponding lamp, the change in voltage value of the image signal when the projection picture's brightness becomes Yq/Yp is obtained, using the gamma characteristic of FIG. 7. Then correction is performed by changing the original voltage value by the obtained amount.

The amount of change is stored in the nonvolatile memory of the brightness correction unit 28, for example, and is relied on for brightness correction until being updated in the brightness correction operation performed thereafter.

At Step S6, if the apparatus having the longest lighting hours is not any of the other apparatuses (i.e. when the apparatus's lamp lighting hours are the longest), then it is not necessary to correct the apparatus's brightness. Therefore Step S7 and S8 will be skipped.

At Step S9, it is judged whether a predetermined time has passed after the operation start of Step S1. If judging affirmatively, the control will be returned to Step S1, and operations of Step S1-S8 will be repeated.

Note that the decreasing speed of lamp brightness is not so fast, and so it is sufficient to set the predetermined time as about 10 hours, for example. Therefore it is designed to reset the counted time and to give an instruction to perform Step S1, when the IC clock (not shown) within the control unit 22 has counted 10 hours.

In addition, the control units 22 of the other apparatuses are to perform the similar operations as the aforesaid brightness correction operation. Therefore needless to say, the predetermined time and the counting start time should be the same for all the apparatuses.

So as to achieve this end, it is possible to have the apparatus to communicate with the other apparatuses, for synchronizing all the counting units. Alternatively, it is possible to set one apparatus as a master, and to make a program by which only the master apparatus manages the time to transmit the lighting hours data to the other apparatuses, and the other apparatuses perform the operations of Step S1-Step S8, being triggered by the reception of the lighting hours data from the master apparatus.

Figure 10:
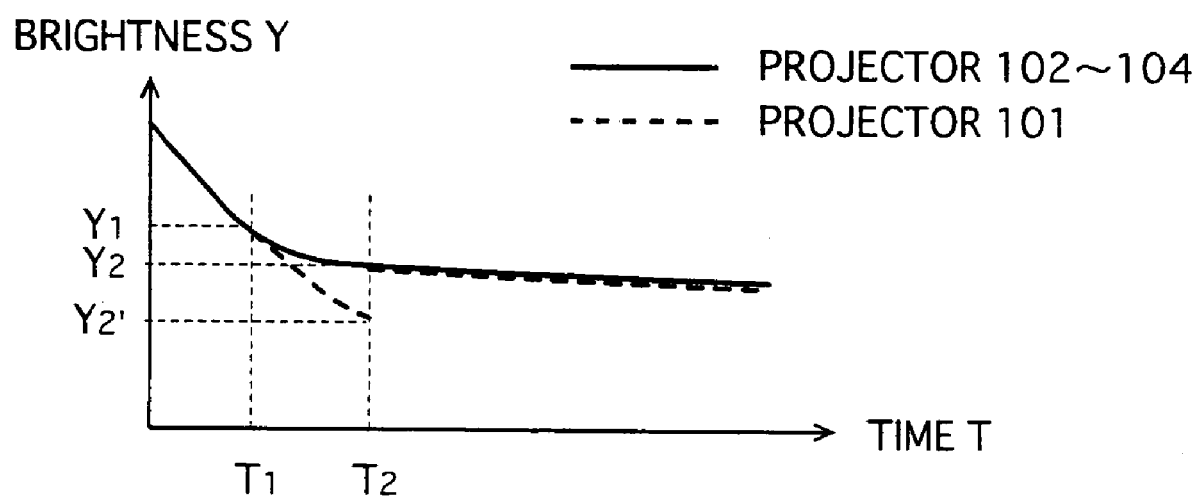
FIG. 10 is a diagram showing the relation of brightness decreasing characteristic among the projectors, in a case when the brightness correction operation is performed at the time T2, which is after the time T1.

FIG. 10 is a graph predicting the brightness change both for the projector 101 (broken line), and for the projectors 102-104 (solid line), where the brightness amendment is performed at the time T1 shown in FIG. 5, and the brightness correction operation is performed at the time T2. As shown in this drawing, between T1 and T2, the brightness of the projector 101 falls below that of the other projectors. However, after being adjusted at T2, the brightness of the projector 101 decreases in about the same way as that of the other projectors, and so there will be little brightness difference among all the projectors. Please note that in this example, the interval between T1 and T2 is set intentionally large, and so the difference is obvious between the brightness of the projector 1 and that of the projectors 102-104. However the actual interval of brightness correction operation is substantially shorter (10 hours in the aforementioned embodiment), and so all the projectors can produce the same brightness at almost all the times.

Modification Examples Of Brightness Correction Operation

Figure 11:
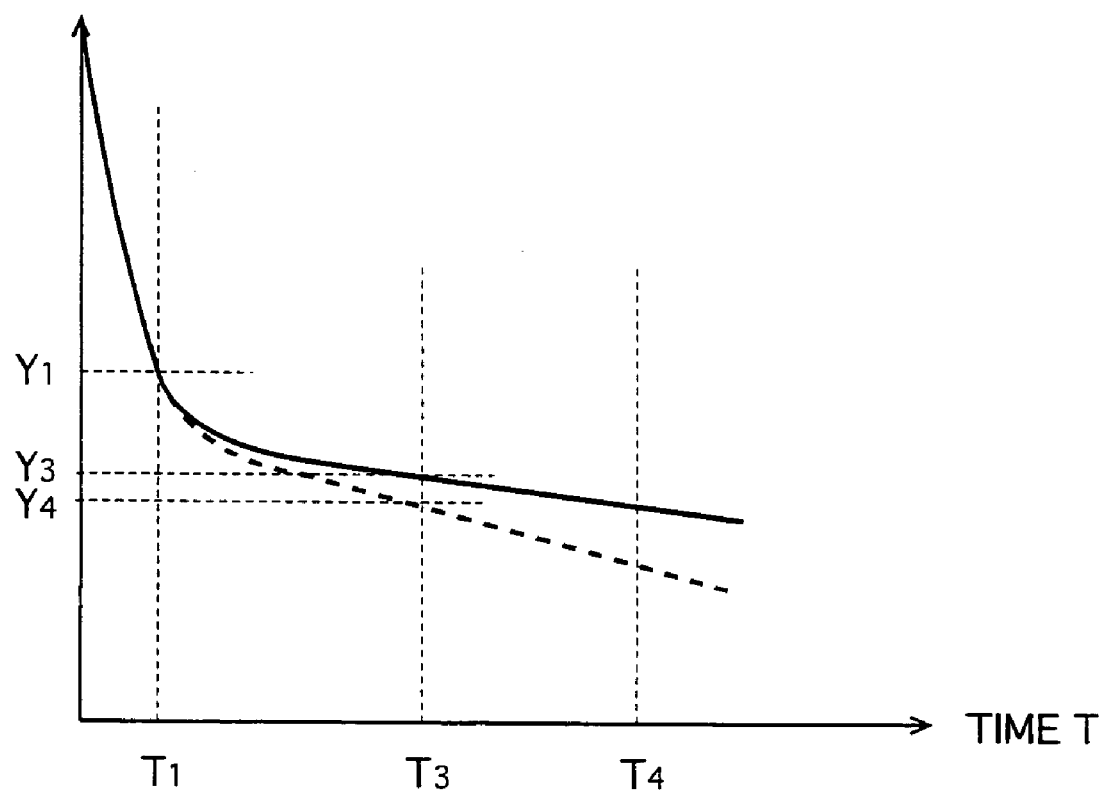
FIG. 11 is a graph when there is a difference between the average brightness decreasing characteristic and the speed of the brightness decrease of the projection lamp actually used.

The brightness decreasing characteristic LUT, stored in the brightness decreasing characteristic memory unit 23, is an average characteristic of the projection lamp 26 of the same kinds. When the projection lamp 26 used happened to have brightness decreasing rate larger than average lamps, there will be a difference between the actual lamp brightness and the lamp brightness estimated from the LUT in the brightness decreasing characteristic memory unit 23 (refer to FIG. 11, where the solid line signifies an average brightness decreasing characteristic, and the broken line signifies a brightness decreasing characteristic of a projection lamp 26 that has a larger rate in brightness decrease. Please note that the scale used for the longitudinal axis (brightness) is set larger than those used in FIGS. 4, 5, and 10, so as to emphasize the difference in brightness decrease). In this case, the operation of FIG. 9 may not be able to completely correct the brightness difference between each projection pictures.

Figure 12:
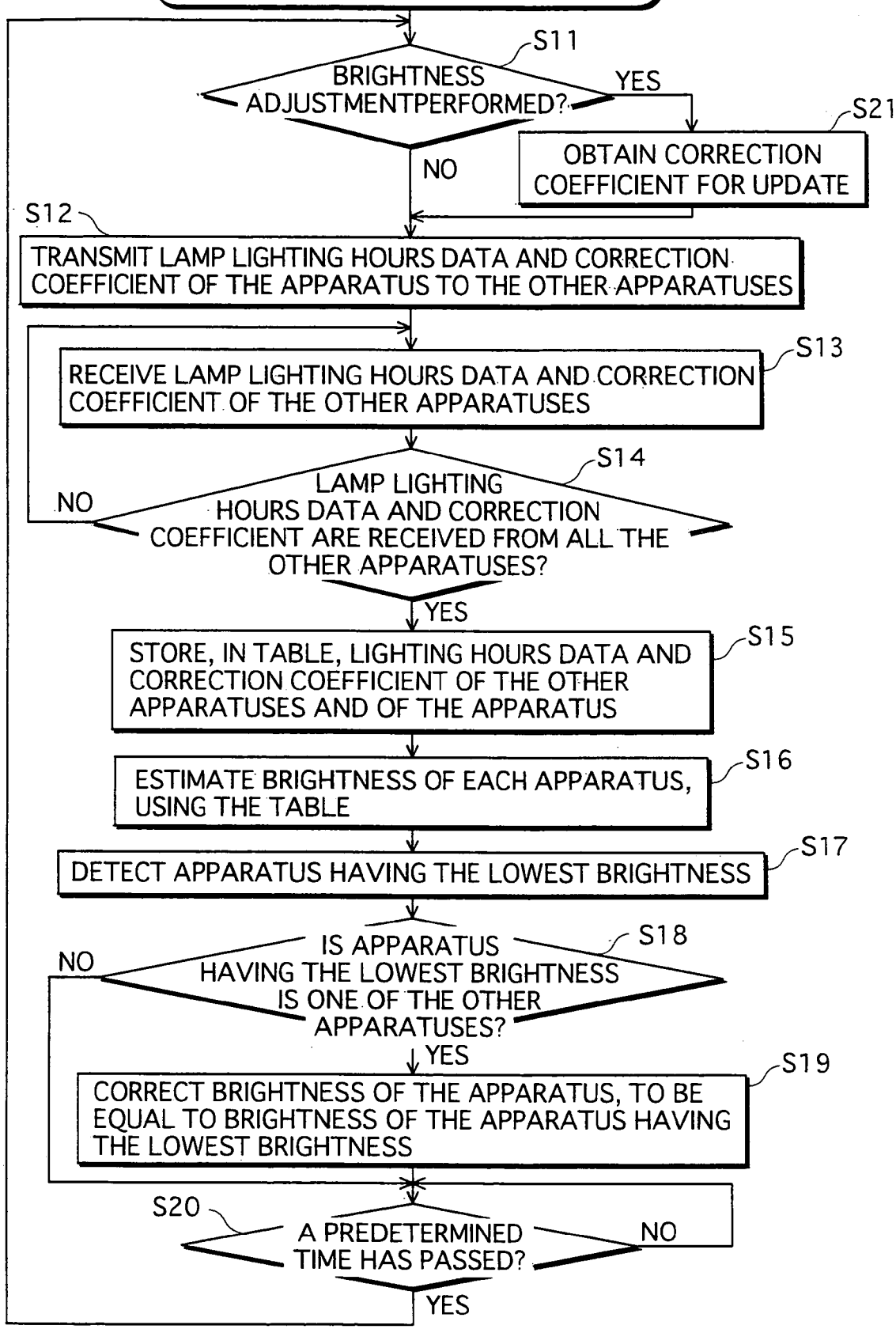
FIG. 12 is a flowchart showing another example of the brightness correction operation.

FIG. 12 is a flowchart showing an example of a brightness correction operation that can deal with such a case. Please note that, just as in FIG. 9, this control is also performed immediately after the power is turned on to the projector, but not limited to such.

In this example, a coefficient for correcting the brightness decreasing characteristic of the brightness decreasing characteristic memory unit 23 (hereinafter "correction coefficient") is set. Note that this correction coefficient's default is set as "1" at the time of apparatus assembly and the like, and is stored in a nonvolatile memory, such as an EEPROM in the control unit 22. This example is characterized by enabling the correction coefficient to be updated when an adjuster has manually adjusted the brightness.

First, it is judged whether manual brightness adjustment has been performed (Step S11. This means that, in a case where a user observes that only the projector 101 has low brightness on its projection picture compared to the other projectors 102-104 in spite of regular automatic brightness corrections, then either the user or a mechanic can adjust the brightness of the projector 101 by operating the remote controller 80 (FIG. 8).

An operation example is described as follows. First, an instruction is given to the image distribution apparatus 100 via an operation unit (unshown) or the remote controller 80, so that an image signal corresponding to "white" all over a screen is to be outputted.

Then, after making sure that the switch 809 is set to the side of a projector, the brightness adjustment mode button 806 is pushed while the function button 805 is being pushed. Then, the ID select button 807 and the apparatus ID number "1" for the projector 101 are pushed in this order. Finally, the enter button 811 is pushed.

By doing so, the remote controller 80 is set to be communicable only with the projector 101, and the projector 101 is set to be in the brightness adjustment mode. Then, one of the up/down keys of a four-direction button 812 is pushed, to change the signal value of the image signal that the brightness correction unit 28 outputs, and to adjust the brightness of the projection picture of the projector 101 to be the same as the brightness of the projection pictures of the projectors 102-104.

If the adjuster has judged that all the projection pictures have the same brightness, the manual brightness adjustment performed by the projector 101 is ended by pushing the enter button 811.

Note that it is possible to set a flag in the RAM of the control unit 22, which indicates that the instruction for switching to the brightness adjustment mode is received from the remote controller 80. Such an arrangement facilitates the judgment of Step S11, because Step S11 can be performed only by checking this flag.

When the aforementioned manual brightness adjustment has been performed, the control will be moved to Step S21, and the correction coefficient is obtained for correcting the brightness decreasing characteristic of the brightness decreasing characteristic memory unit 23. The obtained correction coefficient is then used to update the value of the correction coefficient stored in the EEPROM of the control unit 22.

Specifically, the correction coefficient is obtainable in the following way, for example.

First, when in the brightness adjustment mode, while the "white" picture is projected, the value of the image signal, outputted to the display-device driving unit from the brightness correction unit 28, is stored in the RAM of the control unit 22, and is compared with the image signal value after the brightness adjustment. Then, a change in brightness of the projection picture, which corresponds to the change in signal value, is obtained using the above-described gamma characteristic. Here, assume that the brightness before brightness adjustment is Ya, and the brightness after the adjustment is Yb (here, Yb>Ya). Then the brightness is considered to be Yb/Ya of the unadjusted brightness. The reason why such an adjustment becomes necessary is that the lamp brightness has deviation of the ratio of Ya/Yb, with respect to the average brightness decreasing characteristic. In spite of that, actual brightness estimation has been performed using the average brightness decreasing characteristic, automatically. In view of this, the accurate brightness value of the projection lamp actually used can be obtained by setting the value of Ya/Yb as the correction coefficient n, and by multiplying, by the value n, the brightness value obtained from the corresponding lighting hours in the average brightness decreasing characteristic LUT.

The flowchart of FIG. 12 is almost the same as the flowchart of FIG. 9, except that the aforesaid Steps S11 and S21 are added, and that the brightness information includes the correction coefficient besides the lighting hours. Therefore, the steps are only briefly explained in the following.

At Step S12, lighting hours data and a correction coefficient of the apparatus are transmitted to the other apparatuses, as brightness information. Meanwhile, lighting hours and correction coefficients of the other apparatuses are received, as brightness information (Step S13). Just as in the case of FIG. 9, the brightness information is assigned apparatus IDs respectively for origin and destination.

When the other apparatuses' lighting hours and correction coefficients are received, then lighting hours and correction coefficients, including those of the, apparatus itself, are stored in the table, in association with the apparatus IDs (Step S15).

Then, the lamp brightness of each apparatus is estimated from the lighting hours and the correction coefficients stored in the table (Step S16). Specifically, a true value of brightness is estimated by multiplying, by the correction coefficient n, the provisional brightness value obtained from the brightness decreasing characteristic LUT.

At Step S17, the apparatus whose estimated brightness is the lowest is detected, and at Step S18, judgment is performed as to whether it is one of the other apparatuses, and if the judgment results in the affirmative, correction is performed so as to correct brightness of the projection picture of the apparatus itself, in accordance with the brightness of the other apparatus (Step S19).

If the apparatus having the lowest brightness is judged to be the apparatus itself at Step S18, the apparatus does not have to correct its brightness, therefore the Step S19 is skipped and the control is moved to Step S20.

Step S20 is for making the control move to Step S11 after a predetermined time, for the purpose of managing the time in this flowchart.

By utilizing the result of manual brightness adjustment, as a feedback, in correcting the lamp brightness obtained using the brightness decreasing characteristic, a more excellent brightness management is enabled.

Please note that this manual brightness adjustment is to be applied if necessary, when actual deviation in brightness happens to occur. In other words it is not necessary to perform the manual brightness adjustment so frequently as the regular adjustments of the adjusters, which have been conventionally performed. In addition, the brightness decrease will be gradual after T1 has passed, and so this portion can be considered closely analogous to a straight line. Therefore, if manual brightness correction is performed at T3 and T4, for example, the correction coefficients n3 and n4 respectively for T3 and T4 will be obtained. Accordingly, an approximate expression for the broken part of the graph can be obtained easily. (For example, the brightness Y4 is obtained as n3\*Y3. Accordingly, the point (T3, Y4) of intersection between T=T3 and the broken line is obtained. Likewise, the point of intersection between T=T4 and the broken line is obtained. Given that two sets of coordinates are obtained, the expression for the straight line passing these two points is easily obtained.)

Then if it is arranged to estimate the brightness after the time T4 using the approximate expression, the sufficient number of manual brightness correction is only twice at most. Note that such an approximate expression is calculated by the control unit 22 based on the program stored in the ROM of the control unit 22. The calculated approximate expression is stored in the EEPROM of the control unit 22.

SECOND EMBODIMENT

In the above-described first embodiment, the projectors 101-104 are designed to exchange brightness information, and to respectively perform brightness correction as necessary. In the second embodiment, the image distribution apparatus is designed to perform brightness correction.

Figure 13:
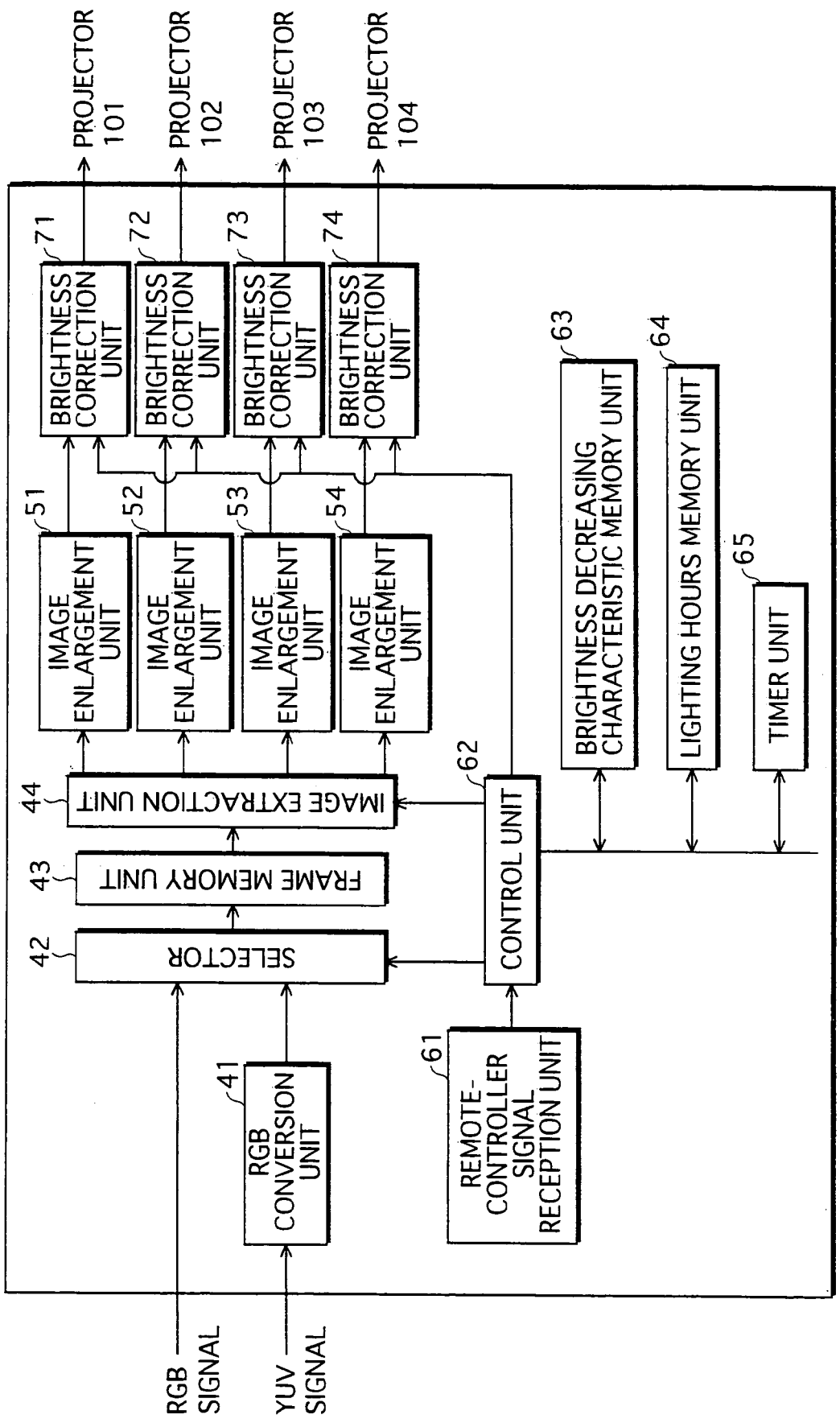
FIG. 13 is a block diagram showing the structure of an image distribution apparatus in a multidisplay apparatus that relates to the second embodiment.

FIG. 13 is a block diagram showing the structure of an image distribution apparatus 200 relating to the second embodiment. In this diagram, the components assigned the same reference numeral have the same structure as in the first embodiment, and so will not be described here. In the following, only the structures unique to the present embodiment are described.

As shown in FIG. 13, in the present embodiment, four brightness correction units 71-74, which correspond to the projectors 101-104, are provided in the image distribution apparatus 200, respectively behind the image enlargement units 51-54.

In addition, the brightness decreasing characteristic memory unit 63 stores a LUT showing the average brightness decreasing characteristic of a projection lamp, which was mentioned above. Furthermore, the lighting hours memory unit 64 stores, for each projectors 101-104, the accumulated lighting hours since the operating start of a corresponding projection lamp. When a projection lamp is replaced for any of the projectors 101-104, the operator inputs the incident using the remote controller or the operating unit not shown in the drawing. In response, the control unit 62 resets the lighting hours of the projector whose lamp has been replaced, to 0.

The timer unit 62 counts the lighting hours. (Here, since the four projectors are lit/extinguished at the same time, individual counting of time is not necessary.) The control unit 62 performs addition of the counted time for each projector, so as to update the respective lighting hours.

The contents of brightness correction operation that the control unit 62 performs are substantially the same as those explained in FIG. 9 and FIG. 12, and so are not described in the following.

What should be emphasized here is that it is no more necessary to transmit/receive the brightness information such as lighting hours among the projectors, and that the control unit 62 directly reads the contents from the lighting hours memory unit 64, which is used to estimate the brightness of each projector based on the LUT of brightness decreasing characteristic stored in the brightness decreasing characteristic memory unit 63. The control unit 62 then controls the brightness correction units 71-74 so that the other three projectors are adjusted to produce the brightness that is the same as the lowest brightness of all the four projectors.

With the above structure, the projectors 101-104 do not have to have an external communication unit 21, a timer unit 27, a brightness decreasing characteristic memory unit 23, a lighting hours memory unit 24, and so on. This is advantageous in restraining the cost of manufacturing a projector to be low.

Furthermore, in the multidisplay apparatus, a control unit for brightness correction operation may be structured as an independent brightness management apparatus in some instances, unlike in the first and second embodiments, where such a control unit is included either in the image distribution apparatus or in each projector.

Figure 14:
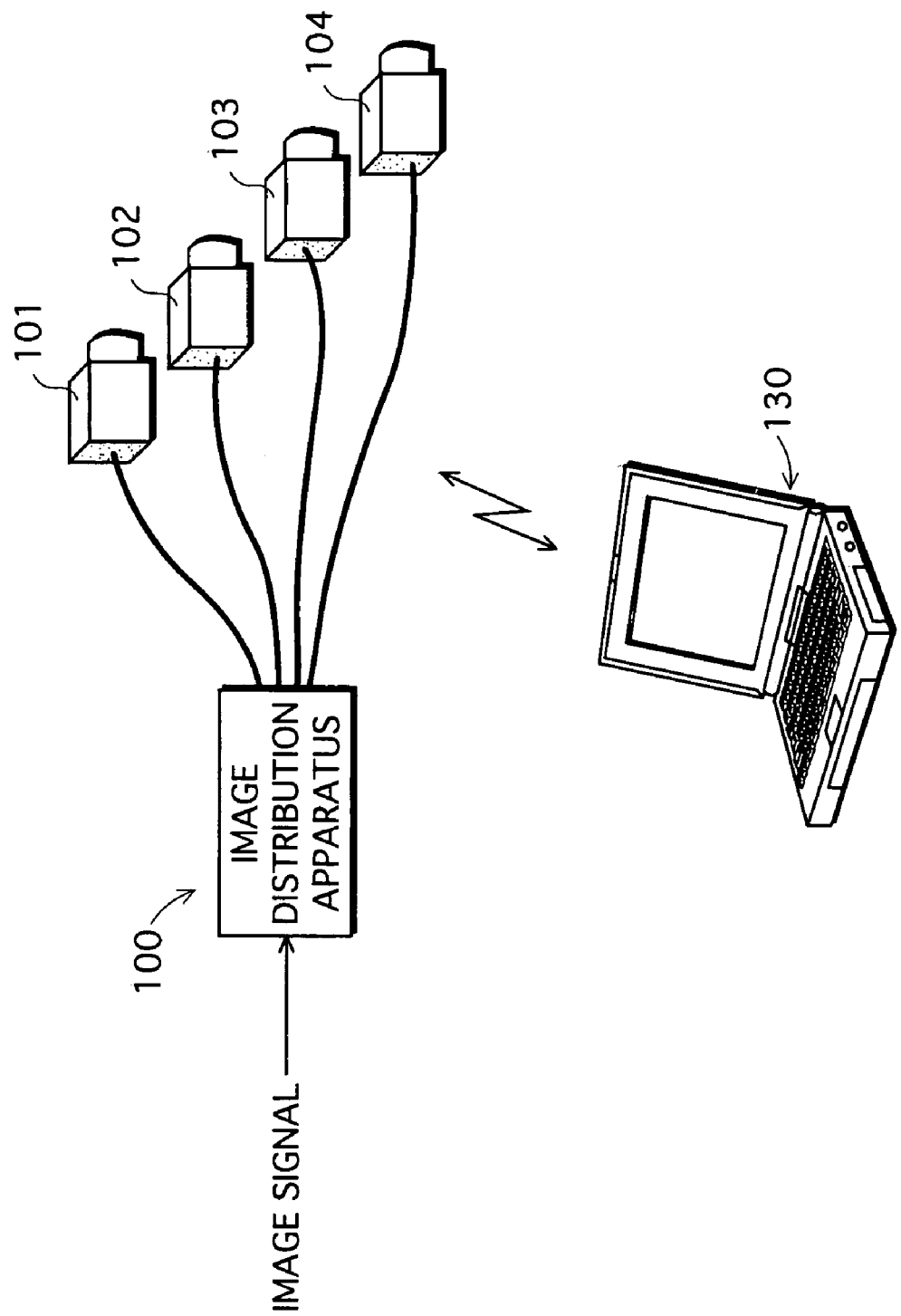
FIG. 14 is a diagram showing one example of the other system structures, in the multidisplay apparatus of the present invention.

FIG. 14 illustrates one example of such a system structure.

In this example, a notebook personal computer 130 is used as the brightness management apparatus.

The personal computer 130 has a wireless LAN function for example, through which it is network connected to the projectors 101-104. A nonvolatile memory within the personal computer 130 stores a LUT indicating the brightness decreasing characteristic. The personal computer 130 performs the functions performed by control unit 62 and the brightness decreasing characteristic memory unit 63 that are described in FIG. 13. On the other hand, the structure of each of the projectors 101-104 is the same as shown in FIG. 3, except that a wireless LAN communication unit is provided instead of the external communication unit 21, and that the brightness decreasing characteristic memory unit 23 is no more necessary.

Either a user or a mechanic installs the program for executing the similar flowchart to FIG. 9, in the hard disk of the personal computer 130, and executes the program.

Note that the flowchart for brightness correction operation according to such a structure will be substantially the same as the flowchart of FIG. 9. However in each step, "the apparatus" and "the other apparatuses" are rewritten as "each apparatus", and Step S1 will be "brightness information transmission request is transmitted to each projector". Moreover the projectors are configured to transmit their own brightness information to the personal computer 130, on receiving the transmission request of Step S1. These pieces of brightness information are in turn received in the personal computer 130, and are stored in the internal table. The personal computer 130 will then estimate the brightness of the projector whose lighting hours are the longest, based on the brightness decreasing characteristic LUT.

Then, the amount of brightness correction to be performed is calculated for each of the other projectors, the amount being necessary for the projector to have the same brightness as the lowest brightness of all the projectors. The personal computer 130, through the wireless LAN, instructs the other projectors to perform brightness correction according to the calculated amount of brightness correction.

When each of the other projectors receives the instruction from the personal computer 130, the control unit 22 controls the brightness correction unit 28, so as to correct the brightness of its own projection picture.

MODIFICATION EXAMPLES

So far, the present invention has been described by way of the embodiment examples. However, it is needless to say that the present invention is not limited to the concrete examples stated in the embodiments. For example, the following modification examples can be conceived.

(1) In the first embodiment stated above, the projectors are connected to each other by communication cables. However, the connection may be performed by wireless communication, such as by using a wireless LAN.

(2) In each of the above-described embodiments, the explanation is based on usage of a translucent liquid crystal projector, as an image display apparatus. However, the image display apparatus is not limited to such, and can be any display apparatus, as long as it has a projection lamp and is able to display an image adjacent to other images displayed by other image display apparatus. For example, the present invention is applicable to a reflection-type projector that uses an optical reflection-type device. One example thereof uses minute mirrors arranged in matrix, and controls the tilting of each minute mirror with use of a piezoelectric element and the like, so as to form an image by a resulting reflection light.

(3) In the first embodiment, the brightness information is explained as to lighting hours counted since the lighting start of a lamp, and a correction coefficient with respect to the average brightness decreasing characteristic. However another example is also possible, in which each projector calculates the brightness estimation of the lamp using its own lamp lighting hours and the brightness decreasing characteristic (that may include a correction coefficient), and transmits the brightness estimation, as the brightness information, to the other projectors.

INDUSTRIAL APPLICABILITY

As explained above, the multidisplay apparatus of the present invention enables automatic brightness adjustment directed to projection pictures of respective image display apparatuses, thereby enabling the same brightness throughout the pictures. As a result, one continuous screen is obtained, from which the viewers will hardly notice the fact that the screen is constituted by a plurality of projection pictures of a plurality of image display apparatuses. In particular, the present invention is appropriate for image display in sites of concerts and events, where a large screen with excellent image quality is required.

The invention claimed is:

1. An image display apparatus of projection-type used in a multidisplay apparatus in which a plurality of image display apparatuses are arranged so as to realize respective projection pictures adjacent to each other, each of the image display apparatus comprising:

an image forming device configured to form an image according to an image signal;

a projection unit including a projection lamp, and configured to form a projection picture by projecting the formed image onto a projection screen;

a first memory unit configured to store lighting hours accumulated since an operating start of the projection lamp of the projection unit;

a second memory unit configured to store an average relation between brightness decrease and accumulated lighting hours for a projection lamp, as a brightness characteristic;

a brightness estimate unit configured to estimate brightness of the projection lamp based on the lighting hours stored in the first memory unit and the brightness characteristic stored in the second memory unit;

a communication unit configured to communicate with other image display apparatuses in the multidisplay apparatus;

a brightness information obtaining unit configured to obtain information that indicates, based on lighting hours of projection lamps of the other image display apparatuses, brightness of the projection lamps of the other image display apparatuses, via the communication unit;

a specifying unit configured to specify an image display apparatus whose projection lamp has lowest brightness among the image display apparatuses, based on the estimated brightness and the information obtained by the brightness information;

a brightness correction unit configured to correct brightness of the projection picture formed by the projection unit so as to be in agreement with brightness of a projection picture formed by the image display apparatus specified by the specifying unit;

a brightness adjustment reception unit configured to receive brightness adjustment for the projection unit input by a user;

a lamp change detection unit including a photoelectronic sensor, the photoelectronic sensor outputting a signal representative of a strength of a light flux of the projection lamp which is regularly sampled, and when a current sample of the signal representative of the strength of the light flux shows a great increase from the latest sample of the signal representative of the strength of the light flux, the lamp change detection unit detects that the projection lamp has been replaced with another projection lamp, wherein upon detection by the lamp change detection unit, that the projection lamp has been replaced with the another projection lamp, then the first memory unit resets the lighting hours stored therein; and a correction coefficient obtaining unit configured to obtain a correction coefficient for correcting the estimated brightness, in accordance with the brightness adjustment received from the user, wherein the correction coefficient is Ya/Yb, where Ya is a brightness before the adjustment by the user, and Yb is a brightness after the adjustment by the user and the brightness estimate unit corrects the estimated brightness of the projection lamp based on the correction coefficient and the estimated brightness of the projection lamp based on the lighting hours.

2. The image display apparatus of claim 1, wherein the brightness correction unit does not correct the brightness of the projection picture formed by the projection unit, when the brightness of the projection lamp of the projection unit is the lowest, and the brightness correction unit corrects the brightness of the projection picture formed by the projection unit, when projection-lamp brightness of any of the other image display apparatuses in the multidisplay apparatus is the lowest, so that the projection picture formed by the projection unit outputs the same brightness as brightness of a projection picture of the lowest brightness apparatus.

3. The image display apparatus of claim 1, wherein the brightness correction unit corrects the brightness of the projection picture formed by the projection unit, by referring to a gamma characteristic showing a relation between a signal value of an inputted image voltage and brightness of a projection picture outputted according to the inputted image signal, to obtain an amount of signal value to be changed so as to achieve target brightness, and by controlling the signal value of the image signal according to the obtained amount of signal value to be changed.

4. A multidisplay apparatus comprising:

a plurality of projection image display apparatuses arranged so as to realize respective projection pictures adjacent to each other; and an image distribution unit configured to generate image signals respectively used for display realized at the image display apparatuses, from an inputted image signal, and to distribute the generated image signals to the image display apparatuses respectively, wherein each of the image display apparatuses includes:

an image forming device configured to form an image according to an image signal;

a projection unit including a projection lamp, and configured to form a projection picture by projecting the formed image onto a projection screen;

a first memory unit configured to store lighting hours accumulated since an operating start of the projection lamp of the projection unit;

a second memory unit configured to store an average relation between brightness decrease and accumulated lighting hours for a projection lamp, as brightness characteristic;

a brightness estimate unit configured to estimate brightness of the projection lamp based on the lighting hours stored in the first memory unit and the brightness characteristic stored in the second memory unit;

a communication unit configured to communicate with other image display apparatuses in the multidisplay apparatus;

a brightness information obtaining unit configured to obtain information that indicates, based on lighting hours of projection lamps of the other image display apparatuses, brightness of the projection lamps of the other image display apparatuses, via the communication unit;

a specifying unit configured to specify an image display apparatus whose projection lamp has lowest brightness among the image display apparatuses, based on the estimated brightness and the information obtained by the brightness information;

a brightness correction unit configured to correct brightness of the projection picture formed by the projection unit so as to be in agreement with brightness of a projection picture of the image display apparatus specified by the specifying unit;

a brightness adjustment reception unit configured to receive brightness adjustment for the projection unit input by a user;

a lamp change detection unit including a photoelectronic sensor, the photoelectronic sensor outputting a signal representative of a strength of a light flux of the projection lamp which is regularly sampled, and when a current sample of the signal representative of the strength of the light flux shows a great increase from the latest sample of the signal representative of the strength of the light flux, the lamp change detection unit detects that the projection lamp has been replaced with another projection lamp, wherein upon detection by the lamp change detection unit, that the projection lamp has been replaced with the another projection lamp, then the first memory unit resets the lighting hours stored therein; and a correction coefficient obtaining unit configured to obtain a correction coefficient for correcting the estimated brightness, in accordance with the brightness adjustment received from the user, wherein the correction coefficient is Ya/Yb, where Ya is a brightness before the adjustment by the user, and Yb is a brightness after the adjustment by the user and further wherein the brightness estimate unit corrects the estimated brightness of the projection lamp based on the correction coefficient and the estimated brightness of the projection lamp based on the lighting hours.

5. A multidisplay apparatus comprising:

a plurality of projection image display apparatuses arranged so as to realize respective projection pictures adjacent to each other; and an image distribution unit configured to generate image signals respectively used for display realized at the image display apparatuses, from an inputted image signal, and to distribute the generated image signals to the image display apparatuses respectively, wherein the image distribution unit includes:

a first memory unit configured to store lighting hours accumulated since an operating start of the projection lamp of each display apparatus;

a second memory unit configured to store an average relation between brightness decrease and accumulated lighting hours for a projection lamp, as brightness characteristic;

a brightness estimate unit configured to estimate brightness of the projection lamp of each display apparatus based on the lighting hours stored in the first memory unit and the brightness characteristic stored in the second memory unit;

a specifying unit configured to specify an image display apparatus whose projection lamp has lowest brightness among the image display apparatuses by comparing brightness of projection lams of the display apparatuses with each other;

a brightness correction unit configured to correct brightness of projection pictures formed by the display apparatuses so as to be in agreement with brightness of a projection picture formed by the image display apparatus specified by the specifying unit;

a brightness adjustment reception unit configured to receive brightness adjustment for a certain display apparatus input by a user;

a lamp change detection unit including a photoelectronic sensor, the photoelectronic sensor outputting a signal representative of a strength of a light flux of one of the projection lamps of the plurality of projection image display apparatuses which is regularly sampled, and when a current sample of the signal representative of the strength of the light flux shows a great increase from the latest sample of the signal representative of the strength of the light flux, the lamp change detection unit detects that the one projection lamp of the plurality of projection image display apparatuses has been replaced with another projection lamp, wherein upon detection by the lamp change detection unit, that the one projection lamp of the plurality of projection image display apparatuses has been replaced with the another projection lamp, then the first memory unit resets the lighting hours stored therein for the one projection lamp of the plurality of projection image display apparatuses; and a correction coefficient obtaining unit configured to obtain a correction coefficient for correcting the estimated brightness, in accordance with the brightness adjustment received from the user, wherein the correction coefficient is Ya/Yb, where Ya is a brightness before the adjustment by the user, and Yb is a brightness after the adjustment by the user and further wherein the brightness estimate unit corrects the estimated brightness of the projection lamp based on the correction coefficient and the estimated brightness of the projection lamp based on the lighting hours.

6. The image display apparatus of claim 1, wherein the brightness estimate unit obtains an approximate expression that reflects the brightness characteristic of the projection lamp that has been actually attached to the projection unit based on two brightness adjustments received by the brightness adjustment reception unit after a prescribed time has passed from the operating start, and corrects the brightness characteristic based on the approximate expression.

7. The image display apparatus of claim 1, wherein the information indicating brightness of the projection lamps of the other image display apparatuses, received via the communication unit, includes lighting hours of the other image display apparatuses accumulated since an operating start of the other image display apparatuses, and the correction coefficient obtained by the correction coefficient obtaining unit, and the specifying unit estimates brightness of the projection lamps of the other image display apparatuses based on the brightness characteristic, the accumulated lighting hours of the other image display apparatuses and the correction coefficient, and specifies the image display apparatus whose projection lamp has lowest brightness among the image display apparatuses based on the estimated brightness of the projection lamp of the projection unit and the information indicating brightness of the projection lamps of the other image display apparatuses.

8. The image display apparatus of claim 1, wherein the information indicating brightness of the projection lamps of the other image display apparatuses, received via the communication unit, indicates brightness estimated by the brightness estimate unit of each of the other image display apparatuses, and the specifying unit specifies the image display apparatus whose projection lamp has lowest brightness among the image display apparatuses by comparing the brightness of the projection lamps of the other image display apparatuses with each other.

* * * * *

UNITED STATES PATENT AND TRADEMARK OFFICE
CERTIFICATE OF CORRECTION

| | |
|---|---|
| PATENT NO. | : 7,589,695 B2 |
| APPLICATION NO. | : 10/514088 |
| DATED | : September 15, 2009 |
| INVENTOR(S) | : Teruto Tanaka |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 286 days.

Signed and Sealed this

Twenty-first Day of September, 2010

David J. Kappos
*Director of the United States Patent and Trademark Office*